US006838834B2

(12) United States Patent
Okawa

(10) Patent No.: US 6,838,834 B2
(45) Date of Patent: Jan. 4, 2005

(54) LIGHTING SYSTEM AND ELECTRIC POWER SUPPLIER FOR THE SAME

(75) Inventor: Masanao Okawa, Woburn, MA (US)

(73) Assignee: Matsushita Electric Works, Ltd., Kadoma (JP)

( * ) Notice: Subject to any disclaimer, the term of this patent is extended or adjusted under 35 U.S.C. 154(b) by 66 days.

(21) Appl. No.: 10/329,533

(22) Filed: Dec. 27, 2002

(65) Prior Publication Data

US 2004/0124784 A1 Jul. 1, 2004

(51) Int. Cl.[7] ........................ H01J 13/32; H02H 5/04

(52) U.S. Cl. ..................... 315/116; 315/107; 315/105; 361/105; 361/103

(58) Field of Search ............................ 315/116, 115, 315/105, 106, 107; 361/105, 103, 106

(56) References Cited

U.S. PATENT DOCUMENTS 5,528,448 A * 6/1996 Brenner et al. ............ 361/103
5,863,111 A * 1/1999 Turner et al. .............. 362/410
5,978,196 A * 11/1999 O'Boyle ..................... 361/103
6,388,397 B1 5/2002 Iwahori ...................... 315/307
6,670,587 B1 * 12/2003 DiSalvo ...................... 219/494

FOREIGN PATENT DOCUMENTS

JP 6-111978 4/1994
JP 10-337009 12/1998

* cited by examiner

*Primary Examiner*—Tuyet Thi Vo
(74) *Attorney, Agent, or Firm*—Oblon, Spivak, McClelland, Maier & Neustadt, P.C.

(57) ABSTRACT

An electronic ballast of a lighting system includes an output power supplier and a heater power supplier. The output power supplier is configured to supply electric power to a lamp of the lighting system. The heater power supplier is configured to provide substantially a rated voltage of a heater of an insulation detector to the heater even though a voltage of an electric power source for the lighting system is different from the rated voltage of the heater.

27 Claims, 15 Drawing Sheets

LIGHTING SYSTEM AND ELECTRIC POWER SUPPLIER FOR THE SAME

BACKGROUND OF THE INVENTION

1. Field of the Invention

The present invention relates to a lighting system, an electric power supplier for the lighting system and an electronic ballast of the lighting system.

2. Discussion of the Background

Japanese Kokai Patent Publication Hei 6-111978, Japanese Kokai Patent Publication Hei 10-337009 and U.S. Pat. No. 6,388,397 disclose an electric power supplier which supplies an electric power to a discharge lamp. The contents of these publications are incorporated herein by reference in their entirety. The electric power supplier disclosed in, for example, Japanese Kokai Patent Publication Hei 10-337009, includes electronic components.

SUMMARY OF THE INVENTION

According to one aspect of the present invention, an electronic ballast of a lighting system includes an output power supplier and a heater power supplier. The output power supplier is configured to supply electric power to a lamp of the lighting system. The heater power supplier is configured to provide substantially a rated voltage of a heater of an insulation detector to the heater even though a voltage of an electric power source for the lighting system is different from the rated voltage of the heater.

According to another aspect of the present invention, an electric power supplier of a lighting system includes an electronic ballast and a heater power supplier. The electronic ballast is configured to supply electric power to a lamp of the lighting system. The heater power supplier is configured to provide substantially a rated voltage of a heater of an insulation detector to the heater even though a voltage of an electric power source for the lighting system is different from the rated voltage of the heater.

According to yet another aspect of the present invention, a lighting system includes a lamp, an insulation detector having a heater, an output power supplier and a heater power supplier. The output power supplier is configured to supply electric power to the lamp. The heater power supplier is configured to provide substantially a rated voltage of the heater of the insulation detector to the heater even though a voltage of an electric power source for the lighting system is different from the rated voltage of the heater.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
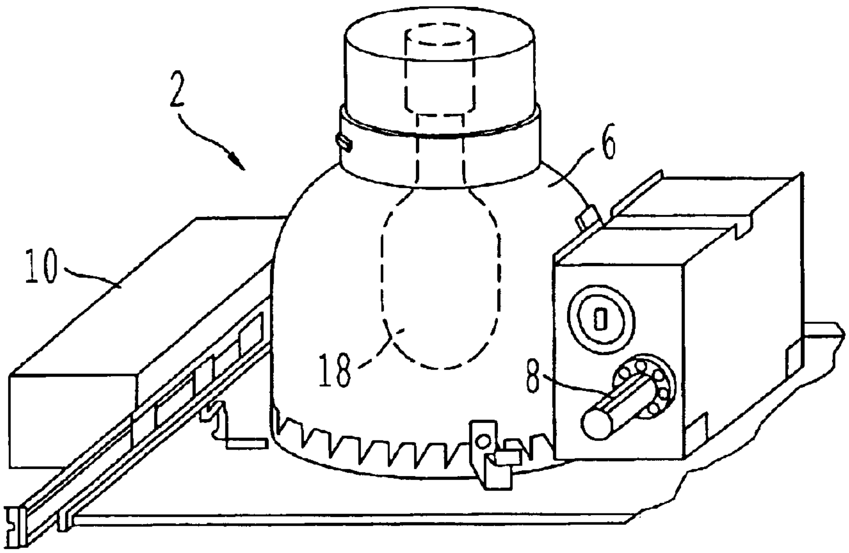
FIG. 1 is a perspective view of a lighting system according to an embodiment of the present invention which is installed on a backside of a ceiling.

The embodiments will now be described with reference to the accompanying drawings, wherein like reference numerals designate corresponding or identical elements throughout the various drawings.

Referring to FIG. 1, a lighting system (downlight system) 2 is installed on a backside of a ceiling. The lighting system 2 includes a reflector 6, a lamp 18 provided in the reflector 6, an insulation detector 8 and an electronic ballast 10 configured to supply electric power to the lamp 18.

The insulation detector 8 detects whether the lighting system 2 is covered by a heat insulator. The lighting system 2 is installed on the backside of the ceiling 4 without being covered by a heat insulator. However, if the lighting system 2 is erroneously installed being covered by a heat insulator, the lighting system 2 might overheat. In such a case, the insulation detector 8 protects the lighting system 2 from overheating by cutting off the power supply to the lighting system 2.

Figure 2:
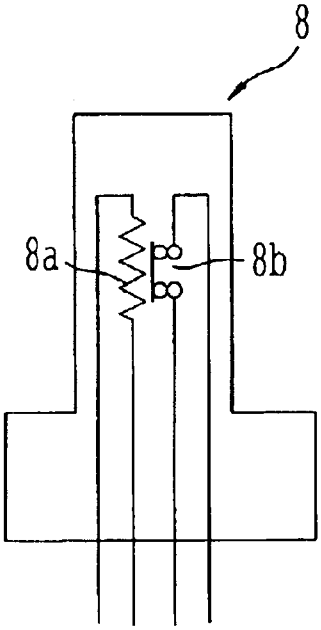
FIG. 2 is a schematically cross-sectional view of an insulation detector.

FIG. 2 is a schematically cross-sectional view of the insulation detector 8. Referring to FIG. 2, the insulation detector 8 includes a heater (8*a*) and a switch (8*b*), for example, a bimetal switch. The heater (8*a*) has a predetermined rated voltage. Electric power is supplied to the heater (8*a*) whenever electric power is supplied to the lighting system 2. When the temperature of the bimetal switch (8*b*) is beyond a predetermined temperature, the bimetal switch (8*b*) cuts off the power supply to the lighting system 2.

Figure 3:
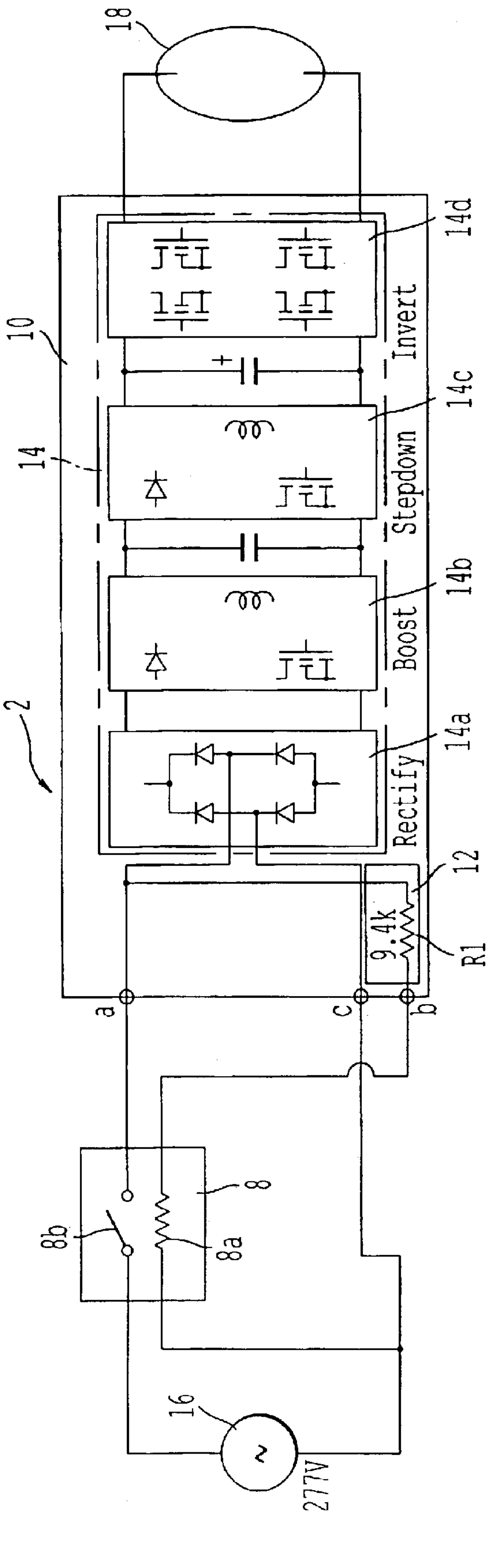
FIG. 3 is an electric circuit of the lighting system according to the embodiment of the present invention.
Figure 5:
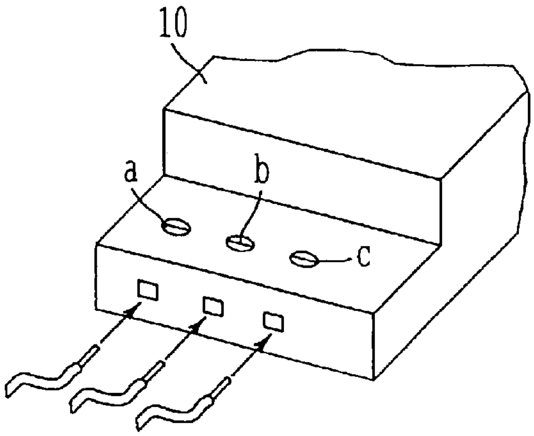
FIG. 5 is a perspective view of an electronic ballast of the lighting system according to the embodiment of the present invention.

FIG. 3 shows an electric circuit of the lighting system 2 according to an embodiment of the present invention. Referring to FIG. 3, the ballast 10 includes a heater power supplier 12, an output power supplier 14, and terminals (a, b and c) (also see FIG. 5). The output power supplier 14 includes a rectifier (14*a*), a booster (14*b*), a step-down converter (14*c*) and an inverter (14*d*). The output power supplier 14 is configured to supply electric power to a lamp 18. The output power supplier 14 is connected to the terminals (a and c). The lamp 18 is connected to the electric power source 16 via the output power supplier 14.

The heater power supplier 12 is configured to provide substantially a rated voltage of the heater (8*a*) of the insulation detector 8 to the heater (8*a*) even though a voltage of an electric power source 16 is different from the rated voltage of the heater (8*a*). In the present embodiment, the rated voltage of the heater (8*a*) is, for example, 120 (V) and the heater power supplier 12 includes a step-down resistor (R1). The step-down resistor (R1) of the heater power supplier 12 is connected to the terminals (a and b).

Figure 4:
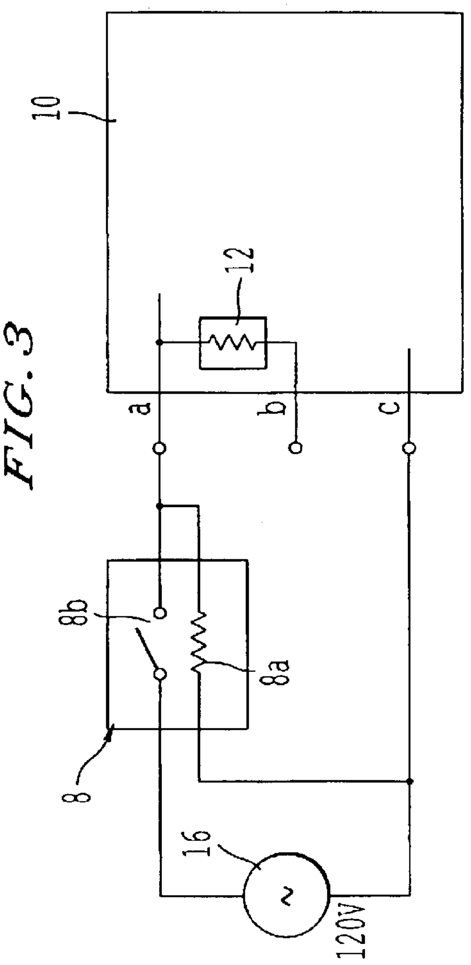
FIG. 4 is an electric circuit of the lighting system according to the embodiment of the present invention.

Referring to FIG. 4, when the voltage of the electric power source 16 is 120 (V), the heater (8*a*) of the insulation detector 8 is connected to the electric power source 16 via the bimetal switch (8*b*) of the insulation detector 8. On the other hand, referring to FIG. 3, when the voltage of the electric power source 16 is 277 (v), the heater (8*a*) of the insulation detector 8 is connected to the electric power source 16 via the step-down resistor (R1) and the bimetal switch (8*b*) of the insulation detector 8.

The resistance value (Ra) of the resistor (R1) is calculated based on the following expression 1.

$$Vh = Vin^{*}\{Rh/(Ra+Rh)\} \qquad (1)$$

Vh: a voltage provided to the heater (8*a*) (120 (V) in this embodiment)

Vin: a voltage of the electric power source 16

Rh a resistance value of the heater (8*a*)

Supposing the heater (8*a*) generates 2 (W) when 120 (V) is provided to it, the resistance value (Rh) of the heater (8*a*) is 7.2 (kΩ). Accordingly, the voltage (Vh) provided to the heater (8*a*) is 120 (V) if the resistance value (Ra) of the resistor (R1) is 9.4 (kΩ).

In the present embodiment, the heater (8*a*) is selectively connected to the terminal (c) when the voltage of the electric power source 16 is 120 (V), or to the terminal (b) when the voltage of the electric power source 16 is 277 (V). Accordingly, even though the voltage of the electric power source 16 is different from the rated voltage of the heater (8*a*), only one kind of the insulation detector whose rated voltage is, for example, 120(V), may be used. Therefore, it is not necessary to choose an insulation detector whose rated voltage is applicable to the voltage of the electric power source. Further, it is not necessary to stock many kinds of insulation detectors whose rated voltages are different.

Figure 6:
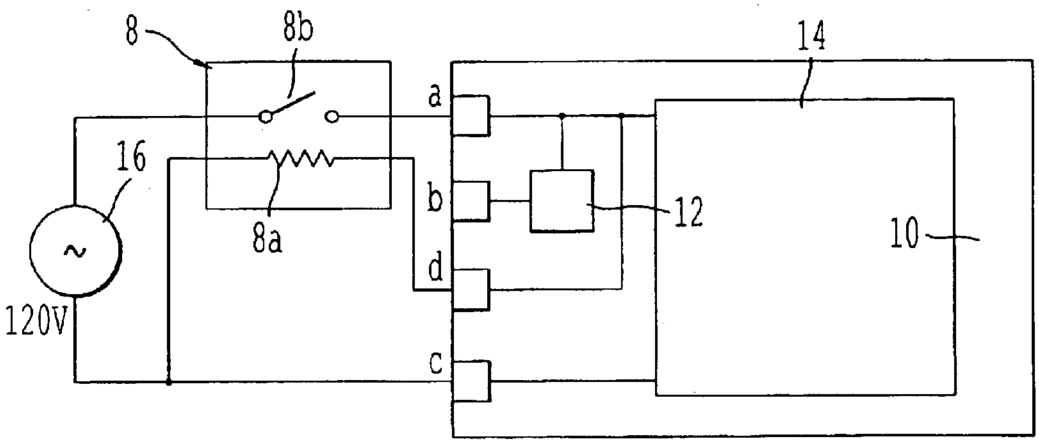
FIG. 6 is an electric circuit of a lighting system according to an embodiment of the present invention.

As shown in FIG. 6, the electronic ballast 10 may have an additional terminal (d). When the voltage of the electric power source 16 is 120 (v), one end of the heater (8*a*) of the insulation detector 8 is connected to the terminal (d) of the electronic ballast 10.

Figure 7:
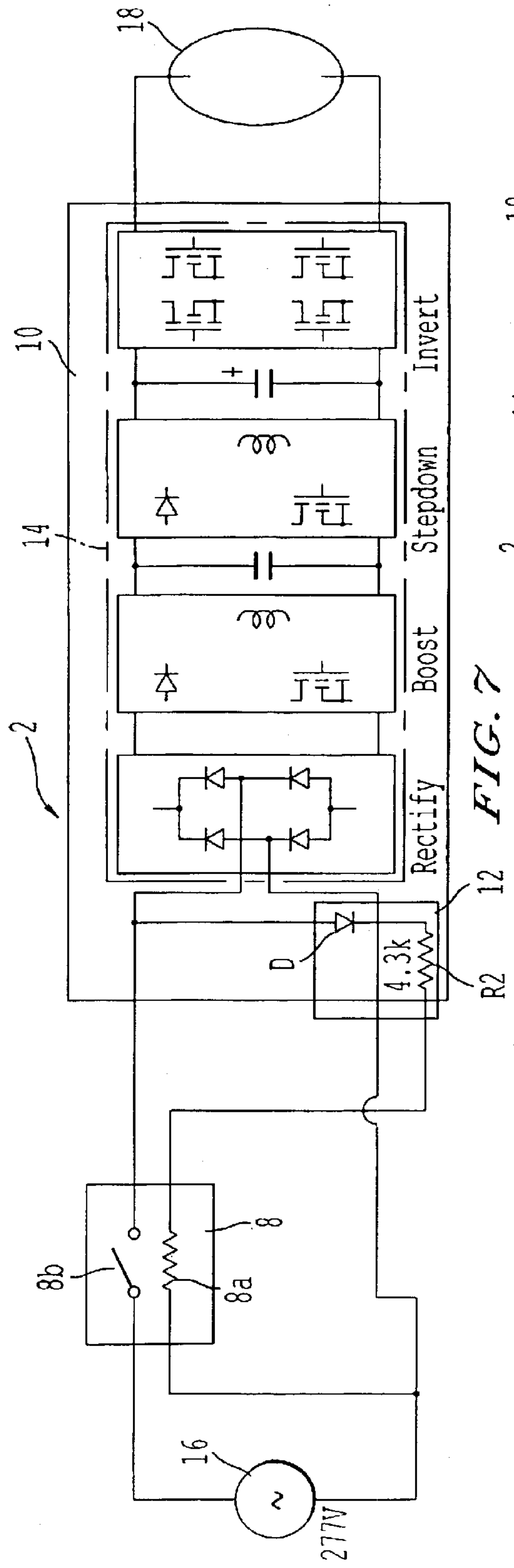
FIG. 7 is an electric circuit of a lighting system according to an embodiment of the present invention.

FIG. 7 shows an electric circuit of a lighting system 2 according to an embodiment of the present invention. Referring to FIG. 7, the heater power supplier 12 includes a diode (D) and a step-down resistor (R2). The heater (8*a*) of the insulation detector 8 is connected to an electric power source 16 via the step-down resistor (R2), the diode (D) and the bimetal switch (8*b*) of the insulation detector 8. In the present embodiment, the heater (8*a*) has a rated voltage of 120 (V) and the voltage of the electric power source 16 is 277 (V).

The resistance value (Rb) of the resistor (R2) is calculated based on the following expression 2.

$$Vh(rms) = Vin^{*}(0.5)^{1/2}{}^{*}\{Rh/(Rb+Rh)\} \qquad (2)$$

Vh(rms): a voltage provided to the heater (8*a*) (120 (V) in this embodiment)

Vin: a voltage of the electric power source 16

Rh: a resistance value of the heater (8*a*)

Supposing the heater (8*a*) has the resistance value (Rh) of 7.2 (kΩ), the voltage (Vh) provided to the heater (8*a*) is 120 (V) if the resistance value (Rb) of the resistor (R2) is 4.3 (kΩ).

Figure 8:
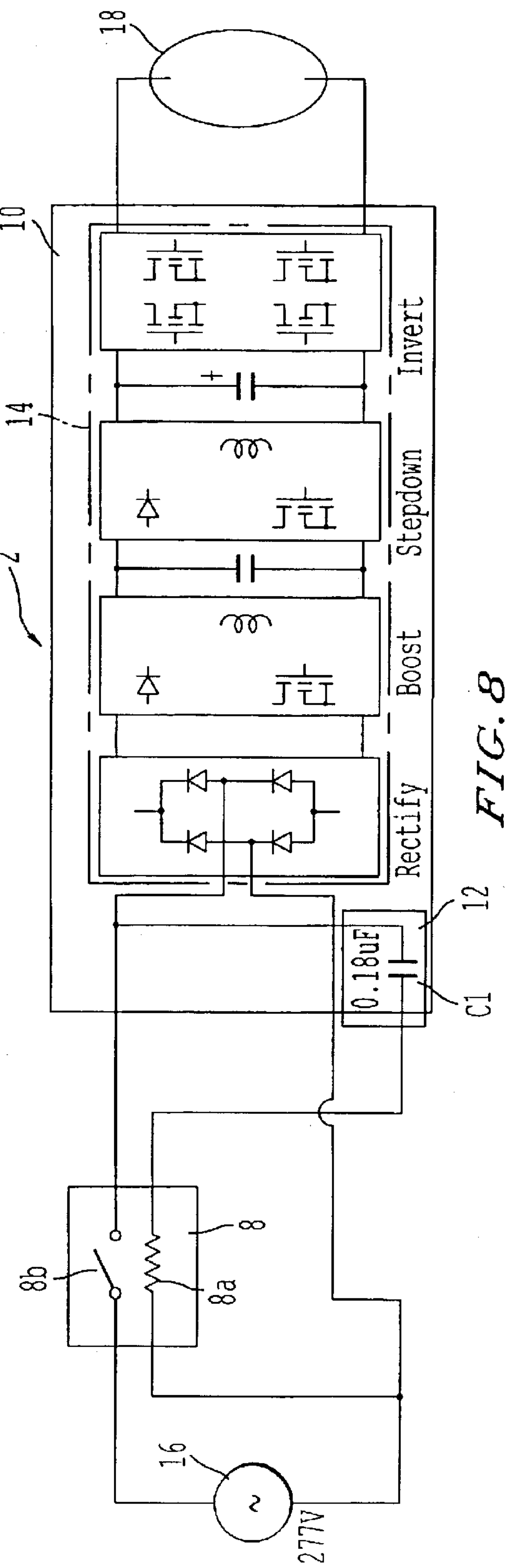
FIG. 8 is an electric circuit of a lighting system according to an embodiment of the present invention.

FIG. 8 shows an electric circuit of a lighting system 2 according to an embodiment of the present invention. Referring to FIG. 8, the heater power supplier 12 includes a capacitor (C1). The heater (8*a*) of the insulation detector 8 is connected to an electric power source 16 via the capacitor (C1) and the bimetal switch (8*b*) of the insulation detector 8.

In the present embodiment, the heater (8*a*) has a rated voltage of 120 (V) and the voltage of the electric power source 16 is 277 (V).

The capacitance (Qa) of the capacitor (C1) is calculated based on the following expression 3.

$$Vh=Vin*\{1/[1+\{1/(2*\Pi*f*Rh*Qa)\}^2]\}^{1/2} \quad (3)$$

Vh: a voltage provided to the heater (8*a*) (120 (V) in this embodiment)

Vin: a voltage of the electric power source 16 f: a frequency of the electric power source 16

Rh: a resistance value of the heater (8*a*)

Qa: a capacitance of the capacitor (C1)

Supposing the heater (8*a*) has the resistance value (Rh) of 7.2 (kΩ), the voltage (Vh) provided to the heater (8*a*) is 120 (V) if the capacitance (Qa) of the capacitor (C1) is 0.18 (μF).

Figure 9:
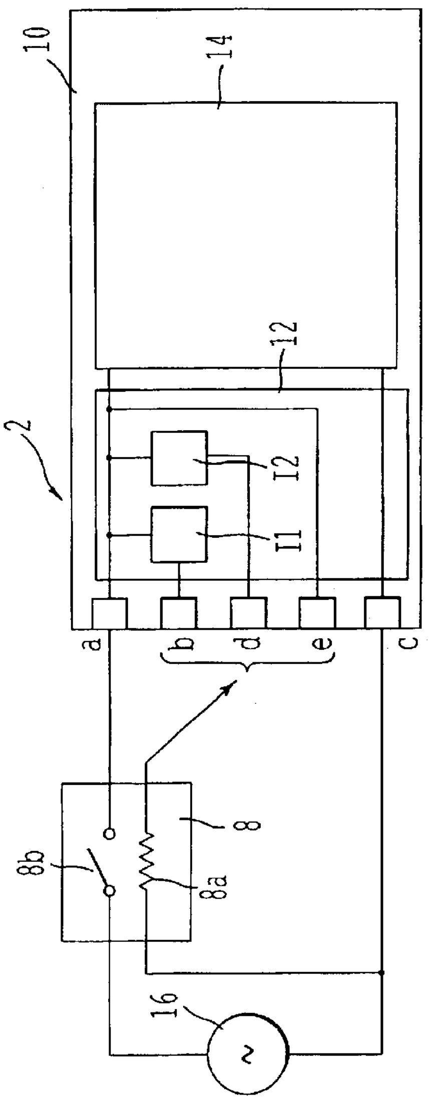
FIG. 9 is an electric circuit of a lighting system according to an embodiment of the present invention.

FIG. 9 shows an electronic ballast 10 according to an embodiment of the present invention. Referring to FIG. 9, the heater power supplier 12 includes first and second impedances (I1 and I2) and terminals (a, b, c, d and e). The terminals (a and c) are connected to the output power supplier 14. The terminal (b) is connected to the terminal (a) via the first impedance (I1). Similarly, the terminal (d) is connected to the terminal (a) via the second impedance (I2). The terminal (e) is connected to the terminal (a). The terminal (c) is connected to the electric power source 16. The terminal (a) is connected to the electric power source 16 via the bimetal switch (8*b*) of the insulation detector 8.

In the lighting system 2 according to the embodiment of the present invention, one end of the heater 8(*a*) is connected to the terminal (b) when the voltage of the electric power source 16 is, for example, 277(V), connected to the terminal (d) when the voltage of the electric power source 16 is, for example, 208 (V), and connected to the terminal (e) when the voltage of the electric power source 16 is, for example, 120 (V). Therefore, the same kind of the insulation detector 8 having a rated voltage of, for example, 120 (V), may be used with respect to three different voltages of the electric power source 16.

Figure 10:
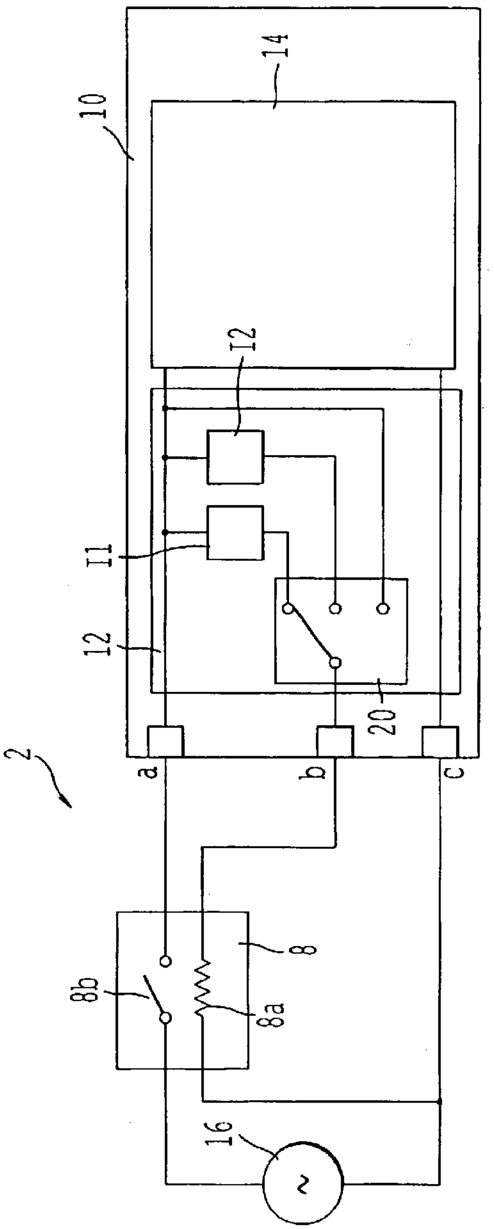
FIG. 10 is an electric circuit of a lighting system according to an embodiment of the present invention.

FIG. 10 shows an electronic ballast 10 according to an embodiment of the present invention. Referring to FIG. 10, the heater power supplier 12 includes first and second impedances (I1 and I2), a switch 20 and terminals (a, b and c). The terminals (a and c) are connected to the output power supplier 14. The terminal (b) is connected to the switch 20. The first and second impedances (I1 and I2) are connected to the terminal (a). The switch 20 is provided to selectively connect the terminal (b) to the terminal (a) directly or via the first impedance (I1) or the second impedance (I2). For example, the first and second impedances (I1 and I2) are a resistor of 9.4 (kΩ) and a resistor of 5.3 (kΩ), respectively. The terminal (c) is connected to the electric power source 16. The terminal (a) is connected to the electric power source 16 via the bimetal switch (8*b*) of the insulation detector 8. The terminal (b) is connected to the heater 8(*a*).

In the lighting system 2 according to the embodiment of the present invention, by manipulating the switch 20, one end of the heater 8(*a*) is connected to the first impedance (I1) when the voltage of the electric power source 16 is, for example, 277(V), connected to the second impedance (I2) when the voltage of the electric power source 16 is, for example, 208 (V), and directly connected to the voltage of the electric power source 16 when the voltage of the electric power source 16 is, for example, 120 (V). Therefore, the same kind of the insulation detector 8 having a rated voltage of, for example, 120 (V), may be used with respect to three different voltages of the electric power source 16.

Figure 11:
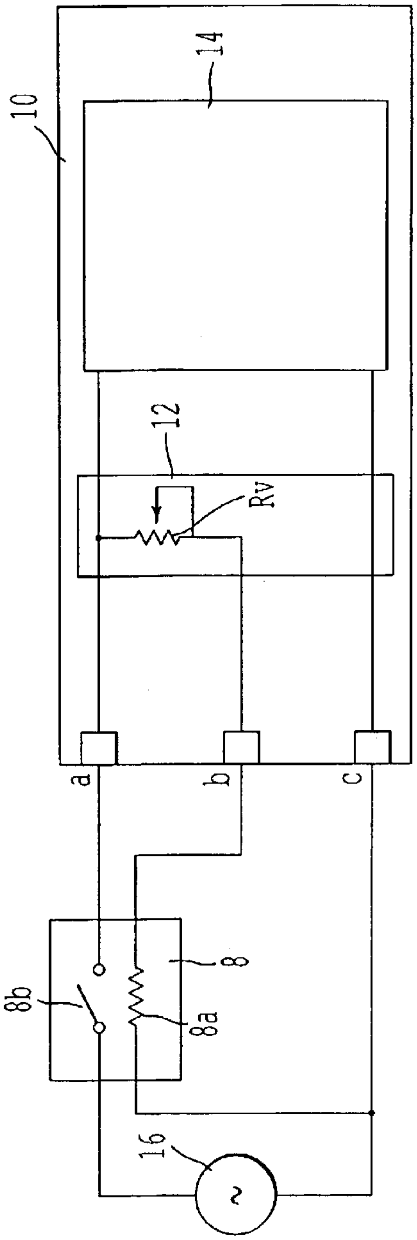
FIG. 11 is an electric circuit of a lighting system according to an embodiment of the present invention.

FIG. 11 shows an electronic ballast 10 according to an embodiment of the present invention. Referring to FIG. 11, the heater power supplier 12 includes a variable resistor (Rv). The terminals (a and c) are connected to the output power supplier 14. The variable resistor (Rv) is connected to the terminals (a and b). The terminal (c) is connected to the electric power source 16. The terminal (a) is connected to the electric power source 16 via the bimetal switch (8*b*) of the insulation detector 8. The terminal (b) is connected to the heater 8(*a*).

In the lighting system 2 according to the embodiment of the present invention, the variable resistor (Rv) is adjusted to provide the rated voltage of the heater (8*a*), for example, 120 (V), to the heater even though the voltage of the electric power source 16 is different from the rated voltage. Therefore, the same kind of the insulation detector 8 having a rated voltage of, for example, 120 (V), may be used with respect to different voltages of the electric power source 16.

Figure 12:
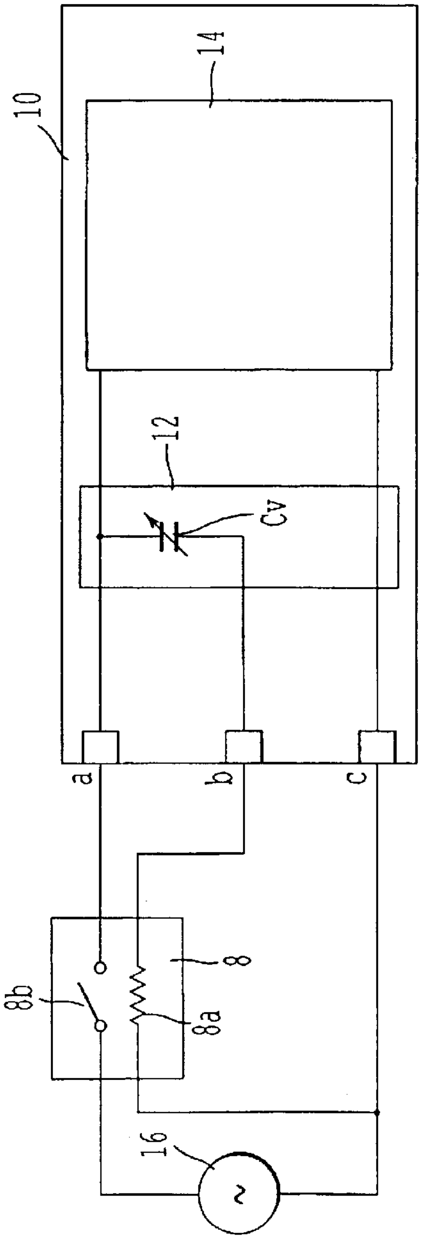
FIG. 12 is an electric circuit of a lighting system according to an embodiment of the present invention.

FIG. 12 shows an electronic ballast 10 according to an embodiment of the present invention. Referring to FIG. 12, the heater power supplier 12 includes a variable capacitor (Cv). The terminals (a and c) are connected to the output power supplier 14. The variable capacitor (Cv) is connected to the terminals (a and b). The terminal (c) is connected to the electric power source 16. The terminal (a) is connected to the electric power source 16 via the bimetal switch (8*b*) of the insulation detector 8. The terminal (b) is connected to the heater 8(*a*).

In the lighting system 2 according to the embodiment of the present invention, the variable capacitor (Cv) is adjusted to supply the rated voltage of the heater (8*a*), for example, 120 (V), to the heater (8*a*) even though the voltage of the electric power source 16 is different from the rated voltage. Therefore, the same kind of the insulation detector 8 having a rated voltage of, for example, 120 (V), may be used with respect to different voltages of the electric power source 16.

Figure 13:
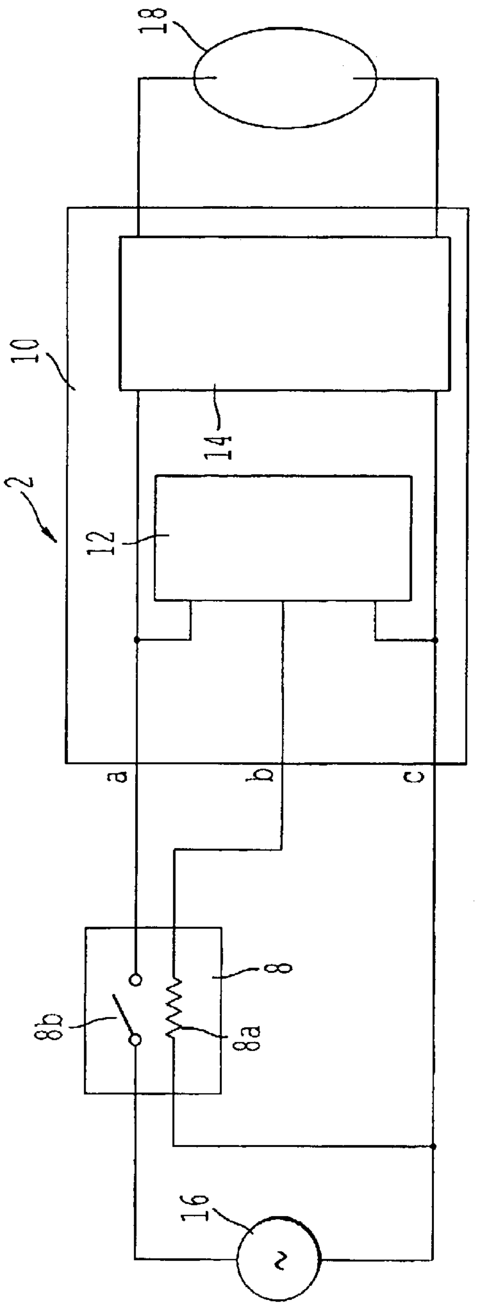
FIG. 13 is an electric circuit of a lighting system according to an embodiment of the present invention.
Figure 14:
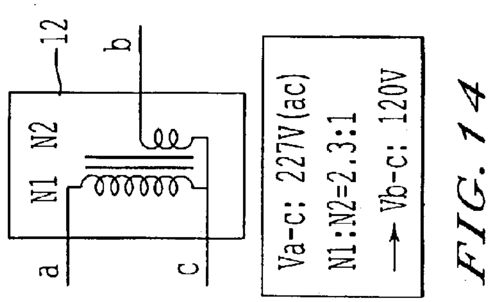
FIG. 14 is an electric circuit of a heater power supplier of the lighting system according to the embodiment of the present invention.
Figure 16:
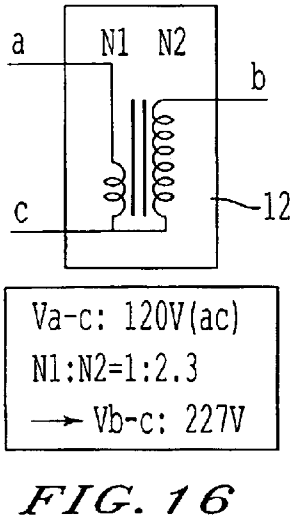
FIG. 16 is an electric circuit of a heater power supplier of the lighting system according to the embodiment of the present invention.

As shown in FIG. 13, the heater power supplier 12 may include any electric components as long as it is configured to boost or decrease the voltage of the electric power source (16) to provide substantially the rated voltage of the heater (8*a*) of the insulation detector 8 to the heater (8*a*). For example, the heater power supplier 12 may be a step-down transformer (FIG. 14) or a boost transformer (FIG. 16).

Figure 15:
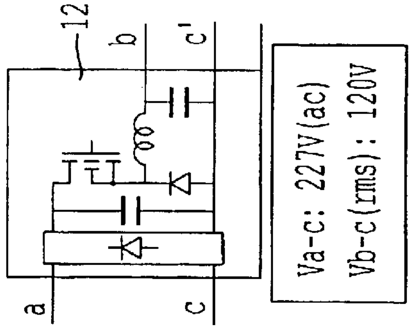
FIG. 15 is an electric circuit of a heater power supplier of the lighting system according to the embodiment of the present invention.
Figure 17:
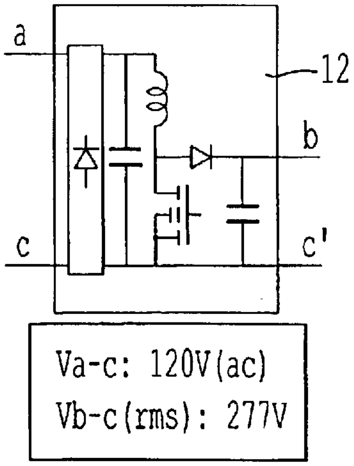
FIG. 17 is an electric circuit of a heater power supplier of the lighting system according to the embodiment of the present invention.
Figure 18:
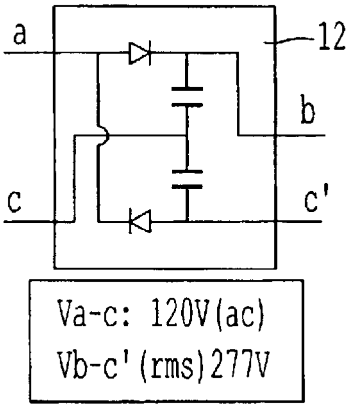
FIG. 18 is an electric circuit of a heater power supplier of the lighting system according to the embodiment of the present invention.
Figure 36:
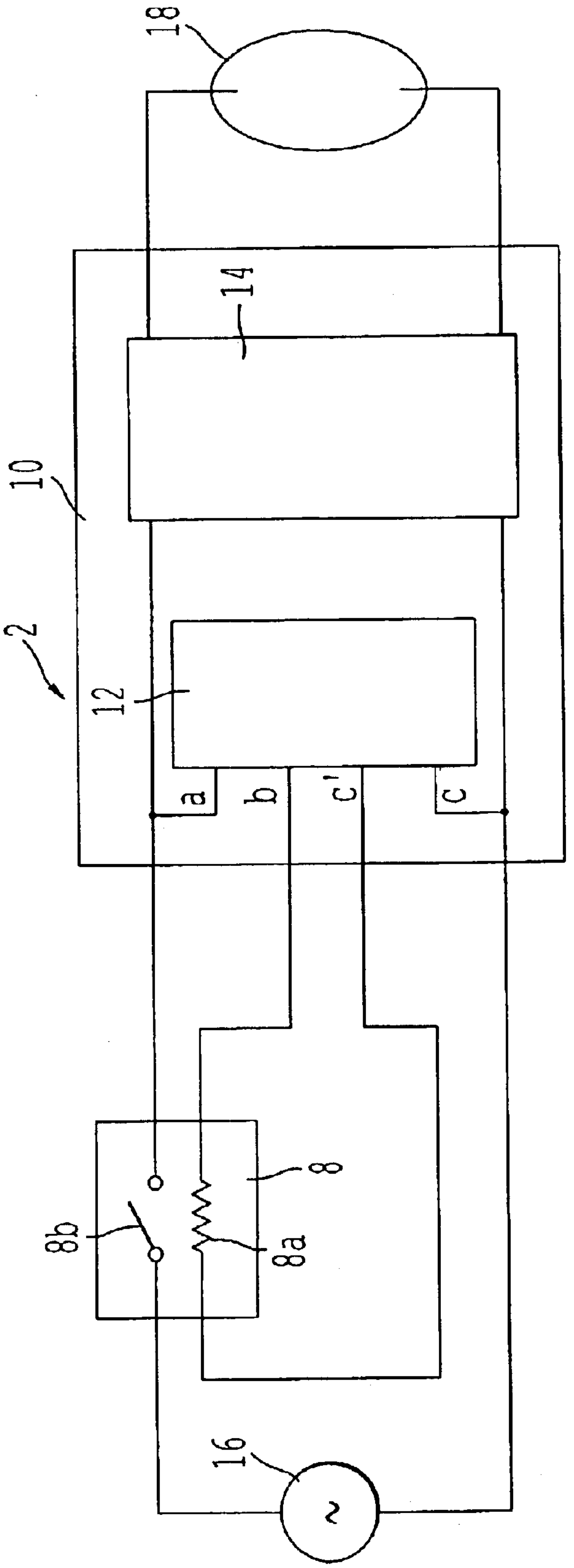
FIG. 36 is an electric circuit of a lighting system according to an embodiment of the present invention.

As shown in FIG. 36, the heater power supplier 12 may include any electric components as long as it is configured to boost or decrease the voltage of the electric power source (16) to provide substantially the rated voltage of the heater (8*a*) of the insulation detector 8 to the heater (8*a*). For example, the heater power supplier 12 may be a step-down converter (FIG. 15), a boost converter (FIG. 17), or a diode circuit (FIG. 18).

Figure 19:
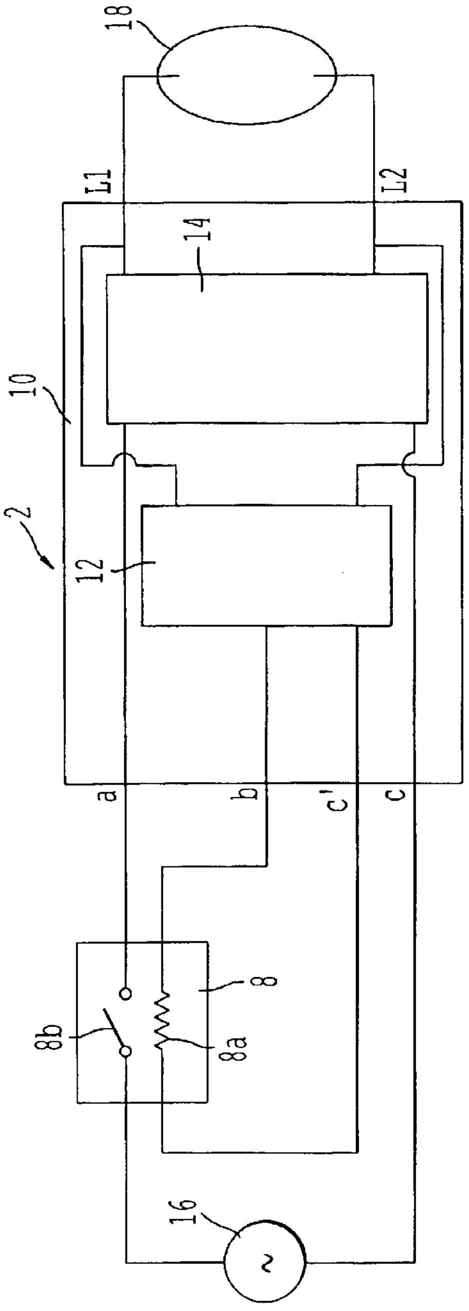
FIG. 19 is an electric circuit of a lighting system according to an embodiment of the present invention.

FIG. 19 shows an electric circuit of a lighting system 2 according to an embodiment of the present invention. Referring to FIG. 19, the heater power supplier 12 is configured to adjust the voltage output from the output power supplier 14 to provide substantially the rated voltage to the heater (8*a*).

Figure 21:
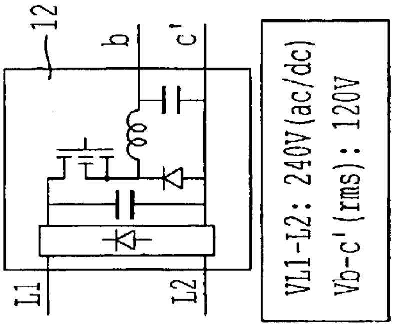
FIG. 21 is an electric circuit of a heater power supplier of the lighting system according to the embodiment of the present invention.
Figure 20:
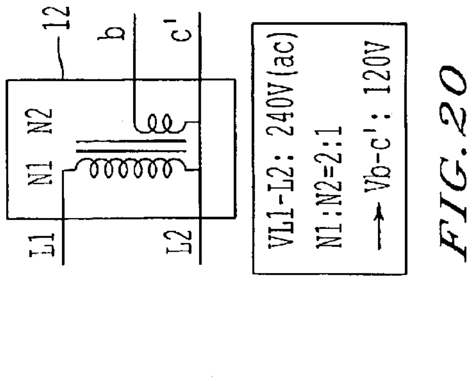
FIG. 20 is an electric circuit of a heater power supplier of the lighting system according to the embodiment of the present invention.
Figure 22:
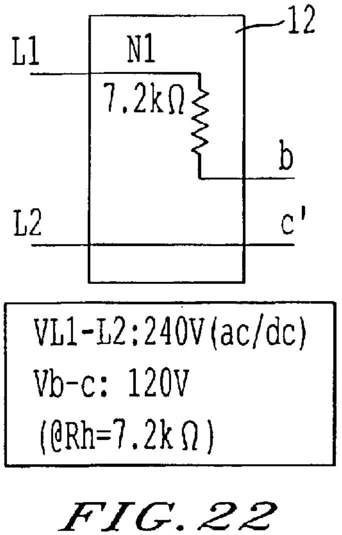
FIG. 22 is an electric circuit of a heater power supplier of the lighting system according to the embodiment of the present invention.
Figure 23:
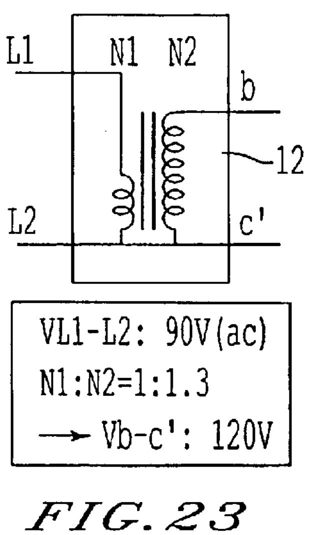
FIG. 23 is an electric circuit of a heater power supplier of the lighting system according to the embodiment of the present invention.
Figure 24:
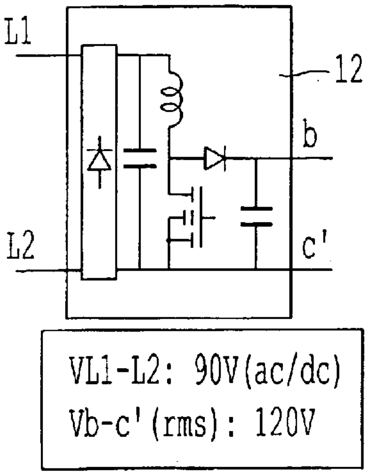
FIG. 24 is an electric circuit of a heater power supplier of the lighting system according to the embodiment of the present invention.
Figure 25:
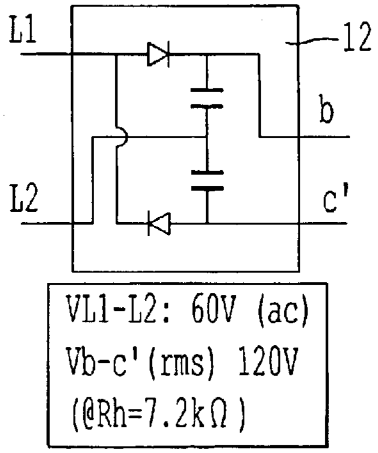
FIG. 25 is an electric circuit of a heater power supplier of the lighting system according to the embodiment of the present invention.

For example, the heater power supplier 12 may include a step-down transformer (FIG. 20), a step-down converter (FIG. 21), a resistor (FIG. 22), a boost transformer (FIG. 23), a boost converter (FIG. 24), or a diode circuit (FIG. 25).

Figure 26:
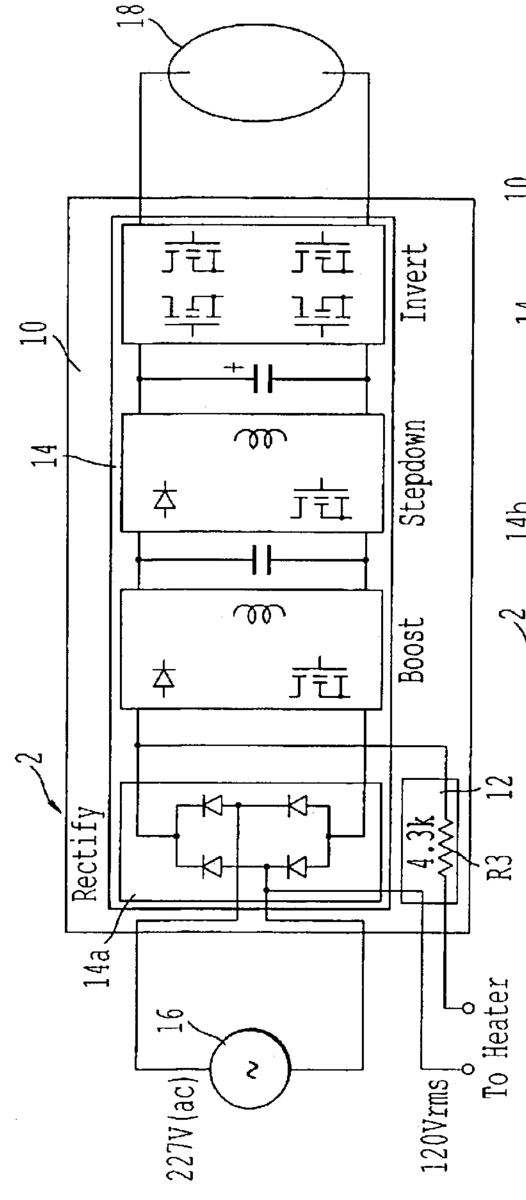
FIG. 26 is an electric circuit of a lighting system according to an embodiment of the present invention.

FIG. 26 shows an electric circuit of a lighting system 2 according to an embodiment of the present invention. Referring to FIG. 26, the output power supplier includes a rectifier (14*a*). The heater power supplier 12 includes a resistor (R3). One of the diodes of the rectifier (14*a*), the resistor (R3) and the heater (8*a*) are connected in series. In the present embodiment, the electric components of the rectifier (14*a*) is utilized as one electric component of the heater power supplier 12 to reduce the voltage.

Figure 27:
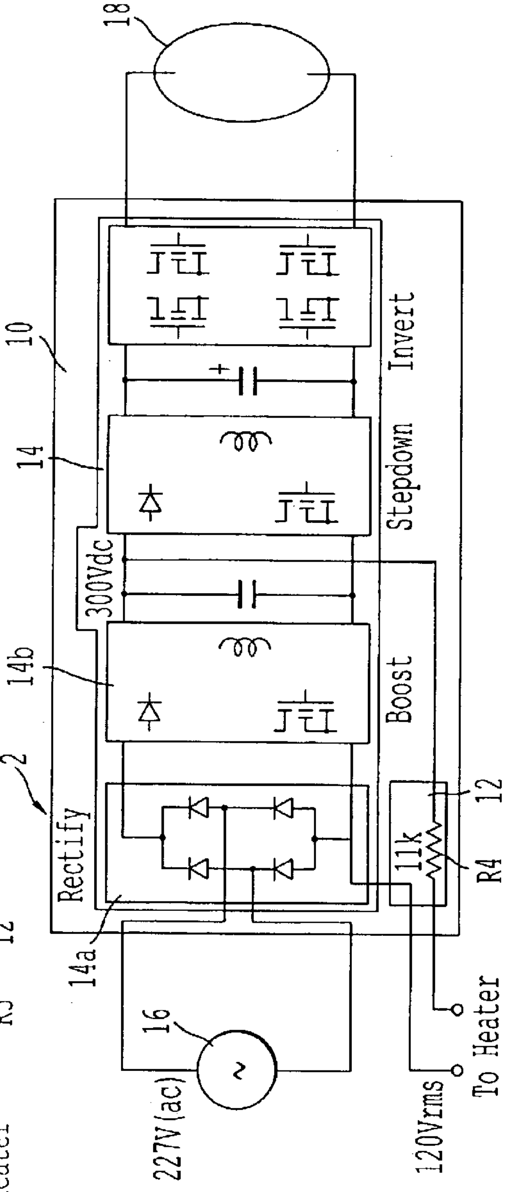
FIG. 27 is an electric circuit of a lighting system according to an embodiment of the present invention.

FIG. 27 shows an electric circuit of a lighting system 2 according to an embodiment of the present invention. Referring to FIG. 27, the output power supplier includes a rectifier (14*a*) and a booster (14*b*). The heater power supplier 12 includes a resistor (R4). The resistor (R4) is connected to the output side of the booster (14*b*). The resistor (R4) reduces the DC voltage output from the booster (14*b*) to apply substantially the rated voltage to the heater (8*a*).

Figure 28:
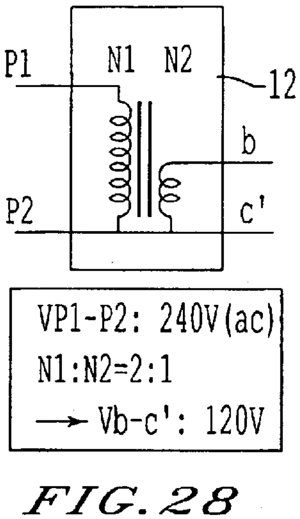
FIG. 28 is an electric circuit of a heater power supplier of the lighting system according to the embodiment of the present invention.
Figure 29:
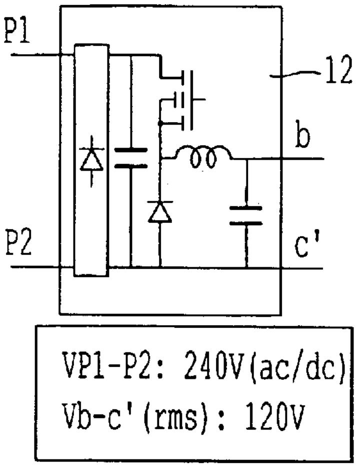
FIG. 29 is an electric circuit of a heater power supplier of the lighting system according to the embodiment of the present invention.
Figure 30:
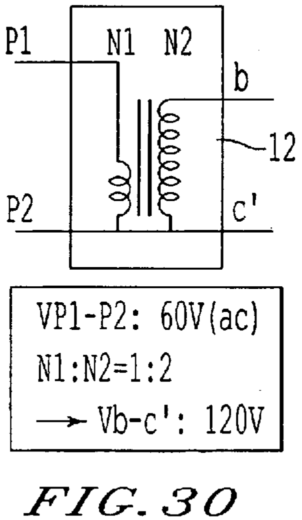
FIG. 30 is an electric circuit of a heater power supplier of the lighting system according to the embodiment of the present invention.
Figure 31:
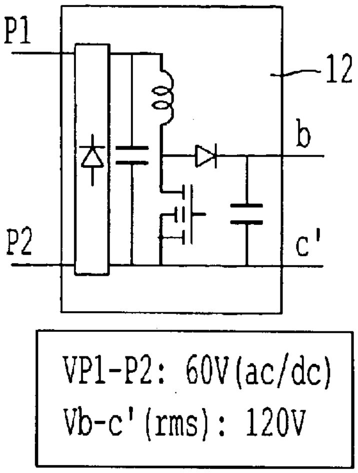
FIG. 31 is an electric circuit of a heater power supplier of the lighting system according to the embodiment of the present invention.
Figure 32:
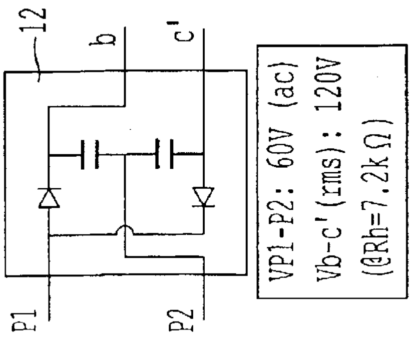
FIG. 32 is an electric circuit of a heater power supplier of the lighting system according to the embodiment of the present invention.

In the embodiments as shown in FIGS. 26 and 27, instead of using the resistor (R3 or R4), a step-down transformer (FIG. 28), a step-down converter (FIG. 29), a boost transformer (FIG. 30), a boost converter (FIG. 31), or a diode circuit (FIG. 32) may be used.

Figure 33:
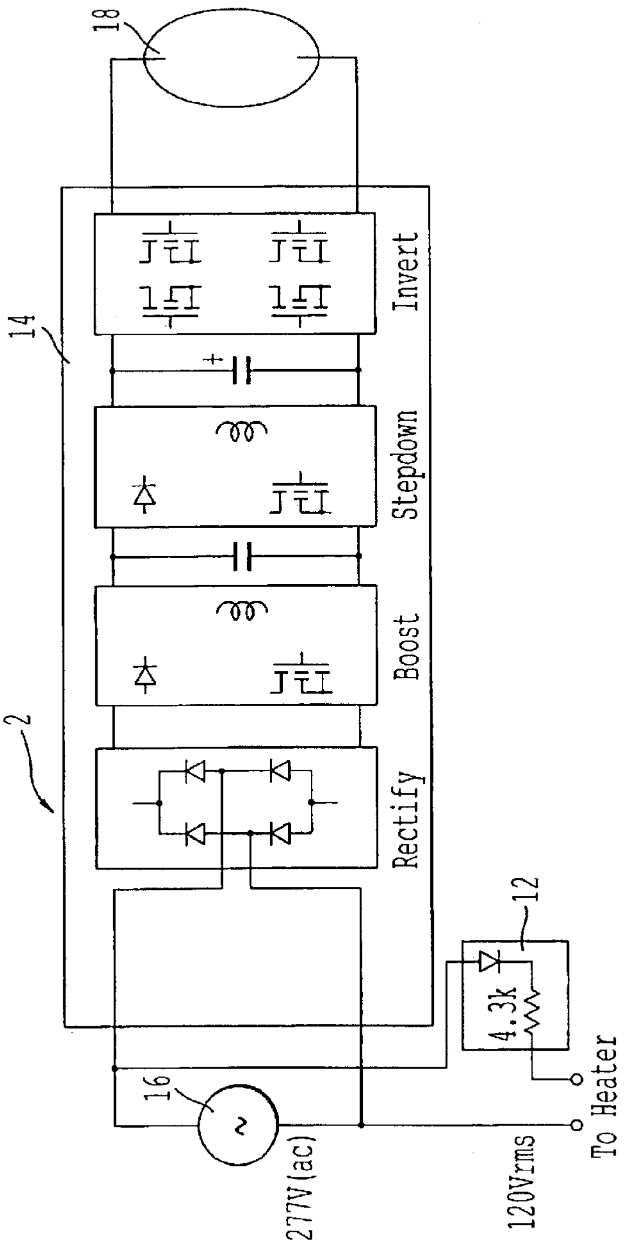
FIG. 33 is an electric circuit of a lighting system according to an embodiment of the present invention.
Figure 34:
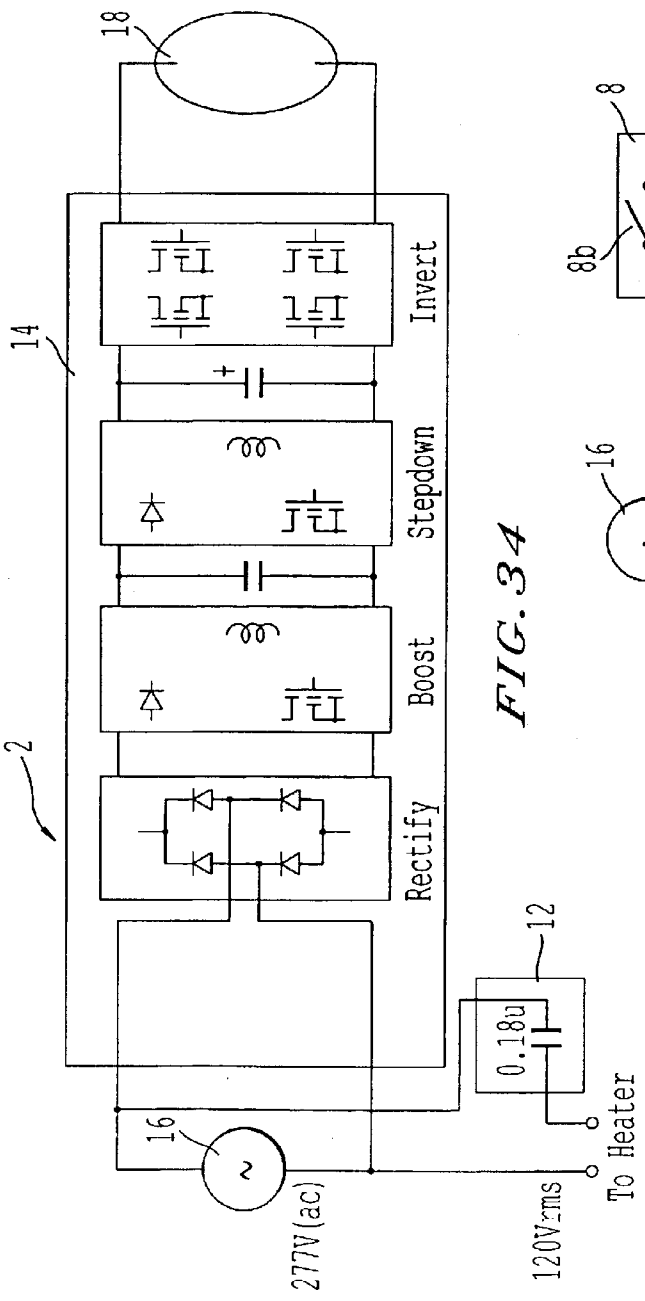
FIG. 34 is an electric circuit of a lighting system according to an embodiment of the present invention.
Figure 35:
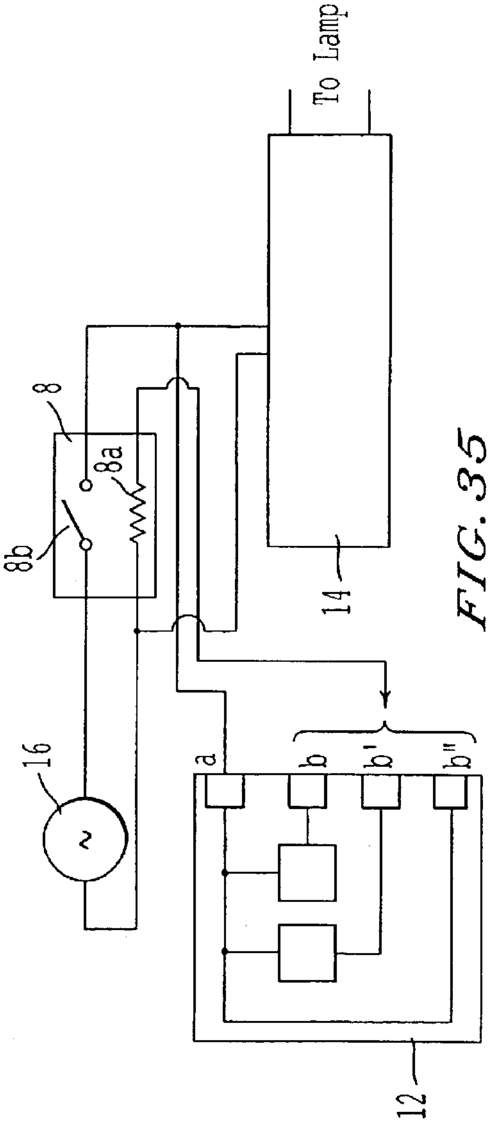
FIG. 35 is an electric circuit of a lighting system according to an embodiment of the present invention.

Although the electronic ballast 10 includes the heater power supplier 12 therein in the above described embodiments, the heater power supplier 12 may be provided outside the electronic ballast 10 as shown in FIGS. 33–35.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States:

1. An electronic ballast of a lighting system, comprising:

an output power supplier configured to supply electric power to a lamp of the lighting system; and a heater power supplier including a voltage adjusting unit which is configured to adjust a voltage of an electric power source for the lighting system to provide substantially a rated voltage of a heater of an insulation detector to the heater.

2. An electronic ballast according to claim 1, wherein said voltage adjusting unit includes at least one transformer which is configured to decrease the voltage of the electric power source to provide substantially the rated voltage to the heater.

3. An electronic ballast according to claim 1, wherein said voltage adjusting unit includes at least one step-down converter which is configured to decrease the voltage of the electric power source to provide substantially the rated voltage to the heater.

4. An electronic ballast according to claim 1, wherein said voltage adjusting unit includes at least one impedance component which is configured to boost the voltage of the electric power source to provide substantially the rated voltage to the heater.

5. An electronic ballast according to claim 1, wherein said voltage adjusting unit includes at least one transformer which is configured to boost the voltage of the electric power source to provide substantially the rated voltage to the heater.

6. An electronic ballast according to claim 1, wherein said voltage adjusting unit includes at least one boost converter which is configured to boost the voltage of the electric power source to provide substantially the rated voltage to the heater.

7. An electronic ballast according to claim 1, wherein said voltage adjusting unit includes at least one impedance component which is configured to decrease a voltage output from said output power supplier to provide substantially the rated voltage to the heater.

8. An electronic ballast according to claim 1, wherein said voltage adjusting unit includes at least one transformer which is configured to decrease a voltage output from said output power supplier to provide substantially the rated voltage to the heater.

9. An electronic ballast according to claim 1, wherein said voltage adjusting unit includes at least one step-down converter which is configured to decrease a voltage output from said output power supplier to provide substantially the rated voltage to the heater.

10. An electronic ballast according to claim 1, wherein said voltage adjusting unit includes at least one impedance component which is configured to boost a voltage output from said output power supplier to provide substantially the rated voltage to the heater.

11. An electronic ballast according to claim 1, wherein said voltage adjusting unit includes at least one transformer which is configured to boost a voltage output from said output power supplier to provide substantially the rated voltage to the heater.

12. An electronic ballast according to claim 1, wherein said voltage adjusting unit includes at least one boost converter which is configured to boost a voltage output from said output power supplier to provide substantially the rated voltage to the heater.

13. An electronic ballast according to claim 1, wherein said voltage adjusting unit includes a plurality of impedance components which are configured to decrease the voltage of the electric power source to provide substantially the rated voltage to the heater and further includes a switch which selectively interpose one of said plurality of impedance components between said heater and to the electric power source.

14. An electronic ballast according to claim 1, wherein said output power supplier includes a rectifier, and wherein said voltage adjusting unit includes at least one impedance component which is configured to decrease a voltage output from said rectifier to provide substantially the rated voltage to the heater.

15. An electronic ballast according to claim 14, wherein said rectifier includes at least one diode, and wherein said at least one impedance component includes a resistor which is connected to the at least one diode in series.

16. An electronic ballast according to claim 1, wherein said output power supplier includes a rectifier and a booster connected to the rectifier, and wherein said voltage adjusting unit includes at least one impedance component which is configured to decrease a voltage output from said booster to provide substantially the rated voltage to the heater.

17. An electronic ballast according to claim 1, wherein said output power supplier includes a rectifier, and wherein said voltage adjusting unit includes at least one transformer which is configured to decrease a voltage output from said rectifier to provide substantially the rated voltage to the heater.

18. An electronic ballast according to claim 1, wherein said output power supplier includes a rectifier, and wherein said voltage adjusting unit includes at least one step-down converter which is configured to decrease a voltage output from said rectifier to provide substantially the rated voltage to the heater.

19. An electronic ballast according to claim 1, wherein said voltage adjusting unit includes at least one impedance component which is configured to decrease the voltage of the electric power source to provide substantially the rated voltage to the heater.

20. An electronic ballast according to claim 19, wherein said at least one impedance component includes a resistor and a diode connected to the resistor in series.

21. An electronic ballast according to claim 19, wherein said impedance component includes at least one resistor.

22. An electronic ballast according to claim 21, wherein said at least one resistor is a variable resistor.

23. An electronic ballast according to claim 19, wherein said impedance component includes at least one capacitor.

24. An electronic ballast according to claim 23, wherein said at least one capacitor is a variable capacitor.

25. An electric power supplier of a lighting system, comprising:

an electronic ballast configured to supply electric power to a lamp of the lighting system; and a heater power supplier including a voltage adjusting unit which is configured to adjust a voltage of an electric power source for the lighting system to provide substantially a rated voltage of a heater of an insulation detector to the heater.

26. An electronic ballast of a lighting system, comprising:

output power supply means for supplying electric power to a lamp of the lighting system; and heater power supply means including a voltage adjusting means for adjusting a voltage of an electric power source for the lighting system to provide substantially a rated voltage of a heater of an insulation detector to the heater.

27. A lighting system comprising:

a lamp;

an insulation detector having a heater;

an output power supplier configured to supply electric power to said lamp; and a heater power supplier including a voltage adjusting unit which is configured to adjust a voltage of an electric power source for the lighting system to provide substantially a rated voltage of the heater of said insulation detector to the heater.

* * * * *